United States Patent
Li

(10) Patent No.: US 12,001,297 B2
(45) Date of Patent: Jun. 4, 2024

(54) DATA BACKUP METHOD AND APPARATUS, SERVER, AND COMPUTER-READABLE STORAGE MEDIUM

(71) Applicant: TENCENT TECHNOLOGY (SHENZHEN) COMPANY LIMITED, Guangdong (CN)

(72) Inventor: Haixiang Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 606 days.

(21) Appl. No.: 17/178,453

(22) Filed: Feb. 18, 2021

(65) Prior Publication Data

US 2021/0173747 A1   Jun. 10, 2021

Related U.S. Application Data

(63) Continuation of application No. PCT/CN2019/122015, filed on Nov. 29, 2019.

(30) Foreign Application Priority Data

Nov. 30, 2018  (CN) .......................... 201811459580.5

(51) Int. Cl.
    *G06F 11/14*          (2006.01)
(52) U.S. Cl.
    CPC ...... *G06F 11/1466* (2013.01); *G06F 11/1435* (2013.01); *G06F 11/1451* (2013.01);
    (Continued)
(58) Field of Classification Search
    CPC ............. G06F 11/1466; G06F 11/1435; G06F 11/1451; G06F 11/1461; G06F 2201/80; G06F 2201/84
    See application file for complete search history.

(56) References Cited

U.S. PATENT DOCUMENTS 7,100,089 B1 *  8/2006  Phelps .................. G06F 3/0607
                                                     714/42
7,831,639 B1 * 11/2010  Panchbudhe .......... G06F 16/10
                                                     711/170
(Continued)

FOREIGN PATENT DOCUMENTS

CN        102591744 A      7/2012
CN        104375904 A      2/2015
(Continued)

OTHER PUBLICATIONS

International Search Report issued Feb. 25, 2020 and Written Opinion in PCT/CN2019/122015 with concise English translation.
(Continued)

*Primary Examiner* — Michael Krofcheck
(74) *Attorney, Agent, or Firm* — ARENTFOX SCHIFF LLP

(57) ABSTRACT

Aspects of this disclosure provide a data backup method and apparatus, a server, and a non-transitory computer-readable storage medium, belonging to the field of data database technologies. The method can include receiving a backup task that is used for backing up a data item of a target data table. The method can further include obtaining a first snapshot difference between a first historical transaction snapshot and a second historical transaction snapshot when a backup time of the backup task is a historical time period. The first historical transaction snapshot and the second historical transaction snapshot can be transaction snapshots respectively located at a start moment and an end moment of the historical time period. Additionally, the method can include performing the backup task based on the first snapshot difference to obtain backup data including at least a visible version of the data item in the target data table.

20 Claims, 4 Drawing Sheets

(52) U.S. Cl.
CPC ...... *G06F 11/1461* (2013.01); *G06F 2201/80* (2013.01); *G06F 2201/84* (2013.01)

(56) References Cited

U.S. PATENT DOCUMENTS

| | | | |
|---|---|---|---|
| 9,817,834 | B1 | 11/2017 | Searls et al. |
| 10,725,966 | B1* | 7/2020 | Deshmukh .......... G06F 11/1458 |
| 2007/0094467 | A1* | 4/2007 | Yamaski ............ G06F 11/2082 |
| | | | 711/162 |
| 2014/0101107 | A1* | 4/2014 | Takayama ............ G06F 3/0679 |
| | | | 707/649 |
| 2017/0286228 | A1 | 10/2017 | Redko et al. |
| 2022/0004462 | A1* | 1/2022 | Vig ......................... G06F 16/27 |

FOREIGN PATENT DOCUMENTS

| | | |
|---|---|---|
| CN | 104778095 A | 7/2015 |
| CN | 106610875 A | 5/2017 |
| CN | 107077495 A | 8/2017 |
| CN | 107835983 A | 3/2018 |
| CN | 110196758 A | 9/2019 |
| CN | 110209528 A | 9/2019 |
| CN | 110309122 A | 10/2019 |
| CN | 110309233 A | 10/2019 |
| JP | 2007317186 A | 12/2007 |
| JP | 2008225693 A | 9/2008 |
| JP | 2012146301 A | 8/2012 |

OTHER PUBLICATIONS

Japanese Office Action issued Jan. 4, 2023 in Application No. 2021-518656 with English Translation, 14 pages.
Keiji Oda, DB System based on 44 Anti-Patterns, 1st Edition, Japan Shoeisha Co., Ltd. Mikio Sasaki, Nov. 27, 2009, pp. 118-119.
Tetsuo Sakata, Initiatives toward the Utilization of Open Source Software, NT T Technology Journal, Japan, Telecommunications Association of Japan, Mar. 1, 2017, vol. 19, No. 3 (vol. 216), pp. 63-67.
Part 3 Case Studies by Theme, Response to unexpected Data Integration, IT Infrastructure Magazine Cloud practical Application, Japan, Nikkei BP, Sep. 10, 2015, pp. 58-59.
Kamezawa Hiroyuki, PART4 Next-Generation Technology Memory Management with attention, leading Edge of Kernel Development in File Systems, Nikkei Linux, Japan, Nikkei BP, Aug. 8, 2014, vol. 16, No. 9, vol. 180, pp. 54-59.
Nagahara Koji, from setup to faster SSD combination, Fast ZFS Storage using FreeBSD, Monthly ASCII Dot Technologies, Japan, ASCII MediaWorks, Dec. 24, 2010, vol. 16, issue 2, p. 100-111.
Japanese Office Action issued Jun. 6, 2022 in Application No. 2021-518656 with English Translation, 11 pages.

* cited by examiner

DATA BACKUP METHOD AND APPARATUS, SERVER, AND COMPUTER-READABLE STORAGE MEDIUM

RELATED APPLICATION

This application is a continuation of International Application No. PCT/CN2019/122015, filed on Nov. 29, 2019, which claims priority to Chinese Patent Application No. 201811459580.5, entitled "DATA BACKUP METHOD AND APPARATUS, SERVER, AND STORAGE MEDIUM" and filed on Nov. 30, 2018. The entire disclosures of the prior applications are hereby incorporated by reference in their entirety.

FIELD OF THE TECHNOLOGY

This application relates to the field of database technologies, including a data backup method and apparatus, a server, and a non-transitory computer-readable storage medium.

BACKGROUND OF THE DISCLOSURE

In a data processing system, especially in a scenario such as an online analytical processing (OLAP) system, a data warehouse, and big data analysis, storing large amounts of data in a database is involved. Because services may be continuously updated, one data item logically includes version data corresponding to a plurality of states. In this way, full state, current state, transitional state, and historical state data of the one data item is saved, making it convenient for a system to track the historical state data and thoroughly mine the value of data. Any data is valuable, and the historical state data cannot be discarded. To ensure data security of the foregoing plurality of types of state data, the full state data needs to be backed up. However, a surge in data volumes inevitably affects backup efficiency. The backup efficiency of the full state data in the context of the surge in data volumes can be a challenge.

SUMMARY

According to various embodiments of this application, a data backup method and apparatus, a server, and a non-transitory computer-readable storage medium are provided.

In an exemplary embodiment, a data backup method is provided that is performed by a server. The method can included receiving a backup task that is used for backing up a data item of a target data table. The method can further include obtaining a first snapshot difference between a first historical transaction snapshot and a second historical transaction snapshot when a backup time of the backup task is a historical time period. The first historical transaction snapshot and the second historical transaction snapshot can be transaction snapshots respectively located at a start moment and an end moment of the historical time period. Additionally, the method can include performing the backup task according to the first snapshot difference, to obtain backup data, the backup data including at least a visible version of the data item in the target data table.

A data backup apparatus is provided that can include a receiving module that is configured to receive a backup task that is used for backing up a data item of a target data table. The apparatus can further include an obtaining module that is configured to obtain a first snapshot difference between a first historical transaction snapshot and a second historical transaction snapshot in a case that a backup time of the backup task is a historical time period, the first historical transaction snapshot and the second historical transaction snapshot being transaction snapshots respectively located at a start moment and an end moment of the historical time period. Additionally, the apparatus can include a backup module that is configured to perform the backup task according to the first snapshot difference, to obtain backup data, the backup data including at least a visible version of the data item in the target data table. Data formats of the backup data can include various files stored in a directory, or a plurality of stored tar packages.

A server is provided, including a processor and a memory that stores least one instruction that, when executed by the processor, cause the server to implement operations performed in the foregoing data backup method.

A non-transitory computer-readable storage medium is provided that stores at least one instruction that, when executed by a processor, causes the processor to implement the operations performed in the foregoing data backup method.

Details of one or more embodiments of this application are provided in the accompanying drawings and descriptions below. Other features and advantages of this application become clearer from the specification, the accompanying drawings, and the claims.

BRIEF DESCRIPTION OF THE DRAWINGS

Various exemplary embodiments of this disclosure that are proposed as examples will be described in detail with reference to the following figures, wherein like numerals reference like elements, and wherein.

DESCRIPTION OF EMBODIMENTS

Figure 1:
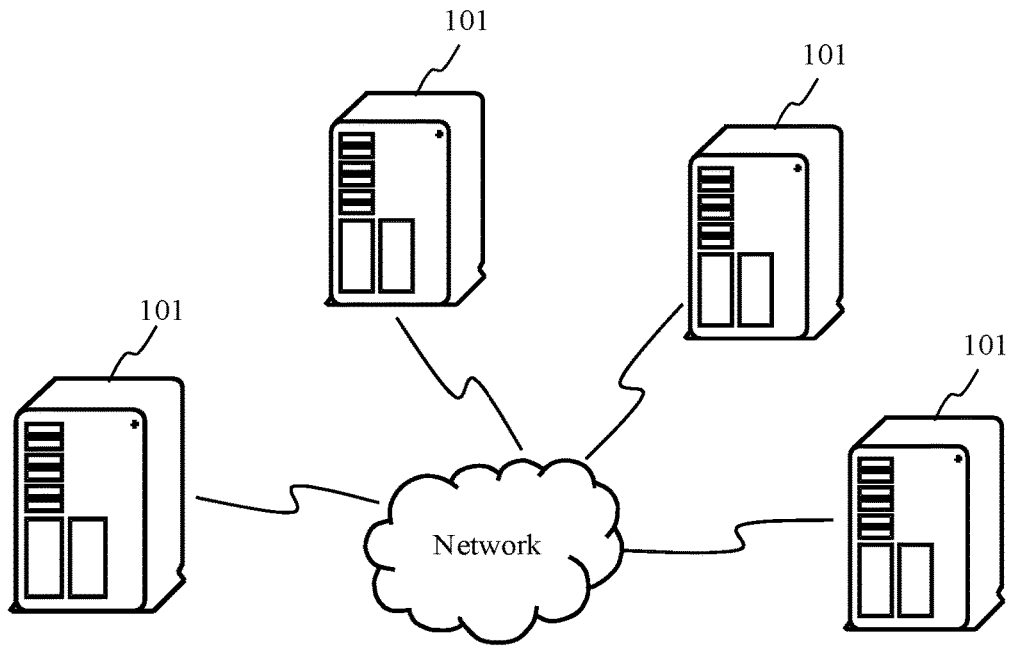
FIG. 1 is a schematic diagram of an implementation environment of a data backup method according to an embodiment of this application.

To make the objectives, technical solutions, and advantages of this disclosure clearer, implementations of this disclosure are further described below in detail with reference to the accompanying drawings.

A database involved in embodiments of this disclosure stores a plurality of data tables. Each data table may be used for storing data items. The data item may have one or more versions. The database may be any type of database based on multi-version concurrency control (MVCC). In the embodiments of this disclosure, a type of the database is not specifically limited. Based on a state attribute, data in the foregoing database may include three states: current state, transitional state, and historical state. The three states are collectively referred to as "a full state of data". Such data is referred to as full state data for short.

Different state attributes in the full state data may be used for identifying states of data in a life cycle track thereof. For example:

Current state: Data of the latest version of a data item is data in a current stage. A state of the data in the current stage is referred to as a current state.

Transitional state: It is neither the latest version nor a historical state version of a data item, and data that is in a transitional data and that is in a process of changing from a current state to a historical state is referred to as half-decay data.

Historical state: It is a state of a data item in history, of which a value is an old value, but not a current value. A state of data in a history stage is referred to as a historical state. There may be a plurality of historical states of one data item, which reflect a state change process of the data. The data in the historical state can be read only, but cannot be modified or deleted.

Under an MVCC mechanism, all the three states of the data exist. Under a non-MVCC mechanism, there may only be the historical state data and the current state data. Under the MVCC mechanism or a locking-based concurrency control mechanism, a new value of the data obtained after a transaction is submitted is in the current state. Taking the MVCC mechanism as an example, a state of data generated by a transaction before the smallest transaction in a currently active transaction list is in the historical state. Under the locking-based concurrency control mechanism, after a transaction is submitted, a value of data before the submission becomes a value in the historical state, that is, an old value of the data item is in the historical state. There is still an active transaction (which is not the latest related transaction) in use in a read version. Because the latest related transaction modifies a value of the data item, and the latest value of the data item is already in a current state, a value that is read is already in a historical state relative to the current state. Therefore, a data state of the data item is between the current state and the historical state, and is thus referred to as the transition state.

For example, under the MVCC mechanism, a balance of an account A in a User table changes from 10 yuan to 20 yuan after top-up, and then changes to 5 yuan by consuming 15 yuan. In this case, a financial institution B has been reading the data and checking the transaction. Afterwards, the balance of the account A changes to 25 yuan after topping up 20 yuan. 25 yuan is current state data, 5 yuan that B is reading is transitional state data, and the remaining two values 20 and 10 are states that have existed in history, and are both historical state data.

For a database that stores any state attribute, when data in the database needs to be backed up, because the database stores at least one version of one data item, a data volume involved in a backup process is huge. For example, if a tuple is updated 10 times in average in a time period, an updated data volume is 11 tuples, that is, 11 times the initial data volume, so that a data volume with a historical state is huge, and backup efficiency becomes a problem. Therefore, the embodiments of this disclosure provide a hybrid physical backup method for performing backup of full state data, which can reduce a backup data volume and improve the backup efficiency.

For the database, a backup task thereof may be triggered by a backup command. An example of a specific form of a backup command is as follows:

```
BEGIN;
    Set BACKUPNAME='/usr/bak/my_first_backup_01' READVIEW
'20180109000000'; //Logical backup based on a historical transaction
snapshot
    BACKUP TYPE LO FROM my_table;
    Set BACKUPNAME='/usr/bak/my_first_backup_02' READVIEW
FROM '20180109000000' TO '20180119000000'; //Logical backup
based on a snapshot difference
    BACKUP TYPE LO FROM my_table;
    Set BACKUPNAME='/usr/bak/my_first_backup_03' READVIEW
default; //Logical backup based on a regular transaction snapshot
    BACKUP TYPE LO FROM my_table WHERE pk>10;
END;
```
, where BACKUPNAME designates the name of a backup data package; my_table designates a backup target data table of this backup task; TYPE LO after the BACKUP field may be used for indicating that a backup type is logical backup, and default may be used for indicating that the backup type is physical backup; and the WHERE statement is used for designating a backup condition of the backup task.

Optionally, in this embodiment, the foregoing data backup method is applicable to a hardware environment including a plurality of servers 101 shown in FIG. 1. As shown in FIG. 1, the plurality of servers 101 are connected by using a network, or data of the plurality of servers 101 may be isolated from each other. The network includes, but is not limited to: a wide area network, a metropolitan area network, or a local area network. The data backup method in this embodiment of this application may be executed by any server 101 or a plurality of servers 101. A database system may be run on the server 101, to provide data services, such as data storage and data query. The database system may work through a database engine run on the server.

The data backup method provided in this embodiment of this disclosure can implement backup of the full state data. For ease of understanding, the following first introduces logical backup and physical backup separately.

1. Logical Backup

The logical backup may easily read a data value at a certain moment in the full state data based on a historical transaction snapshot or/and a regular transaction snapshot. Specific implementation policies of the logical backup are as follows: (1) back up current state data based on a regular transaction snapshot; (2) back up historical state data and transitional state data based on a historical transaction snapshot; (3) simultaneously back up a plurality of versions of a data item based on a historical transaction snapshot and a regular transaction snapshot.

A data form obtained based on the three policies of logical backup is data organized based on a format of a backup instruction. Therefore, this type of backup may be referred to as logical backup. For example, the backup instruction may be a SQL statement, and a specific data organization format of the statement may be organized according to an INSERT format. Names of files in the backup data package may be different according to the backup type. For example, files obtained through the logical backup may be named in a manner of LoData_00000001 or the like, and meta information files corresponding to the files may be named in a manner of LoMeta_00000001 or the like.

The foregoing data backup method of logical backup cannot back up the entire system, that is, through the foregoing data backup method, one backup package may be obtained, but information such as a control file may not be recorded in the meta information file.

A difference between the logical backup involved in this embodiment of this application and a conventional backup method lies in that one is to support backup of the full state data, two is to support backup atomically in a SQL statement manner rather than a command line (CLI) manner, and three is to generate a physical backup package similar to a physical backup manner.

2. Physical Backup

The physical backup refers to physical backup in a conventional database system. Because in the physical backup, a transaction snapshot in a historical time period cannot be designated for the backup task, only current state data can be backed up, that is, data obtained through the physical backup only includes the current state data, but does not include historical state data. In a backup data package obtained through the physical backup, data files may be named in a manner of PhData_00000001 or the like, and meta information files corresponding to the data files may be named in a manner of PhMeta_00000001 or the like.

3. Hybrid Backup

Based on the descriptions of the foregoing first part and second part, the following describes a hybrid backup method involved in this embodiment of this disclosure. Based on different backup tasks, backup target data may be different. The hybrid backup may include the following four types based on the backup target data.

Figure 2:
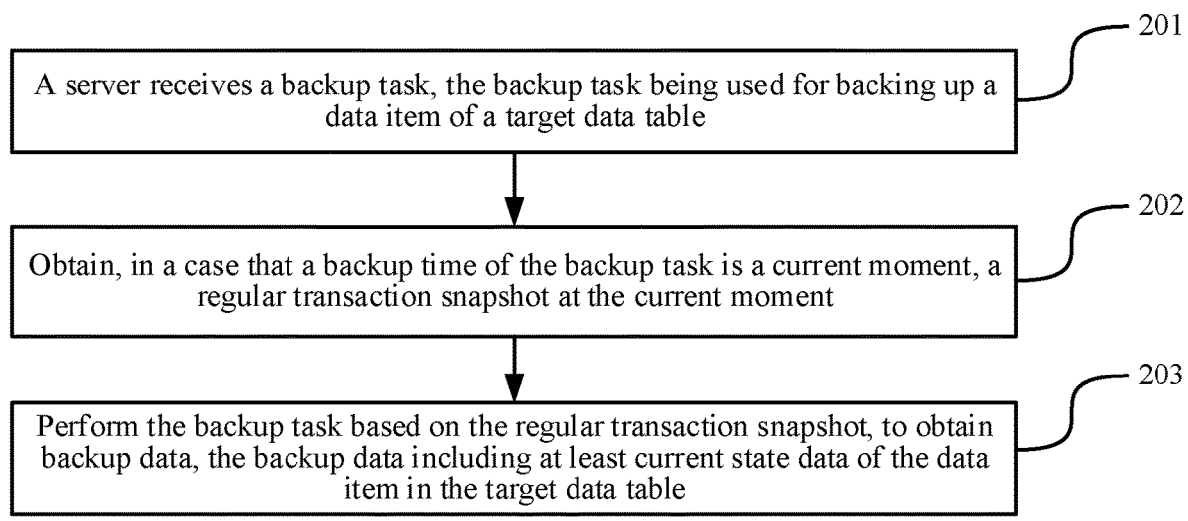
FIG. 2 is a flowchart of a data backup method according to an embodiment of this application.

A first type is current state data point value backup. That is, current state data may be backed up based on a regular transaction snapshot. A backup data package of the backup includes a meta information file, a current state data file, and a REDO log file. An example in which a current state data point value is backed up by using a data backup method shown in the flowchart of FIG. 2 is used for description below. Specifically, the data backup method includes the following process.

In step 201, a server receives a backup task, the backup task being used for backing up a data item of a target data table. A backup time indicated by the backup task is a current moment.

In step 202, the method obtains, in a case that a backup time of the backup task is a current moment, a regular transaction snapshot at the current moment.

In the foregoing steps 201 and 202, the server may receive the backup task by receiving a backup instruction, and the backup instruction carries information about a backup target. In this embodiment of this disclosure, only an example in which the backup time is a current moment is used for description. For example, the current moment in the backup instruction may be represented as "default", that is, target data of the backup instruction is current state data at the current moment.

In step 203, the server performs the backup task based on the regular transaction snapshot, to obtain backup data, the backup data including at least current state data of the data item in the target data table. In this embodiment of this disclosure, the transaction snapshot may indicate readable data and active transactions in a current system at a creation moment of the transaction snapshot, where data of the active transactions cannot be read by a transaction, so that visible versions of tuples at the current moment are learned. Therefore, through the regular transaction snapshot, it can be determined that a current state version of the data item in the target data table is visible, that is, the backup data obtained through backup includes the current state data of the data item in the target data table.

In a possible implementation, the server may back up the current state data in a block backup manner. That is, for any data block corresponding to the target data table, a data block in which the current state data is located is backed up in the form of block copy based on the regular transaction snapshot, to obtain the backup data. The manner of backing up the current state data in the form of block copy speeds up the backup. Because the current state data, the transitional state data, and the historical state data are physically separated, the form of block copy can be realized.

The backup data obtained in this embodiment of this disclosure includes a backup data package. The backup data package is a complete backup data package that maintains data consistency. Each backup data package has two optional forms: one is various files stored in a directory, and the other is a backup package formed by a plurality of tar packages.

In a backup data package in the form of various files stored in a directory, the files are named with different file names according to types. For example, meta information files are named by using Meta_00000001, Meta_00000002, and the like; data files are named by using Data_00000001, Data_00000002, and the like; and log files are named by using Log_00000001, Log_00000002, and the like. In a format such as "00000002", each character is represented in hexadecimal, and a maximum quantity of files that can be represented is "16^8=4,294,967,296".

Meta information is usually small and may usually be stored in one file. A data file may be defined as a specific size. For example, if a size of each data file is defined as 1 T, the data file may store up to 4 EB of data. In addition, on different operating systems, maximum file sizes of the data files are different. For example, the maximum size of a single file of Ext2/Ext3 (8 kB block size) is 64 TB, and more data can be stored. Management forms such as a specific size of the log file may be the same as that of the data file. Details are not described herein. In this embodiment of this disclosure, the "00000002" format may support a larger data volume by expanding a quantity of bits.

In a backup data package formed by a plurality of tar packages, the storage of files is the same as the foregoing process, and a difference lies in that the files are packaged according to file sizes for convenience of unified management. Further, a compression algorithm may be introduced to save storage space.

In a case that the backup target of the backup task includes current state data, the backup data further includes a meta information file, a data file, and a log file of the current state data. In a possible implementation, to ensure consistency during restoration based on the backup, when the log file is backed up, segmented backup may be performed on the log file of the current state data from a start moment of a backup process to an end moment of the backup process. For example, a location where a REDO log is obtained at the start moment of the backup process is assumed to be Loc1; at the same time, a new transaction is supported to be performed; a location where the REDO log of the system is obtained at the end moment of the backup process is assumed to be Loc2; and then REDO logs between Loc1 and Loc2 are archived and backed up to the backup data package. The log file is backed up by using an immediate backup policy. One piece of log information may be backed up once generated, or a segment of log information may be backed up once generated. Because logs may be managed in a manner of segmented file, there may be many small segmented files in the log file. For example, a log file of PostgreSQL is formed by a plurality of files of 1G size. Therefore, the foregoing log backup method can be realized.

Figure 3:
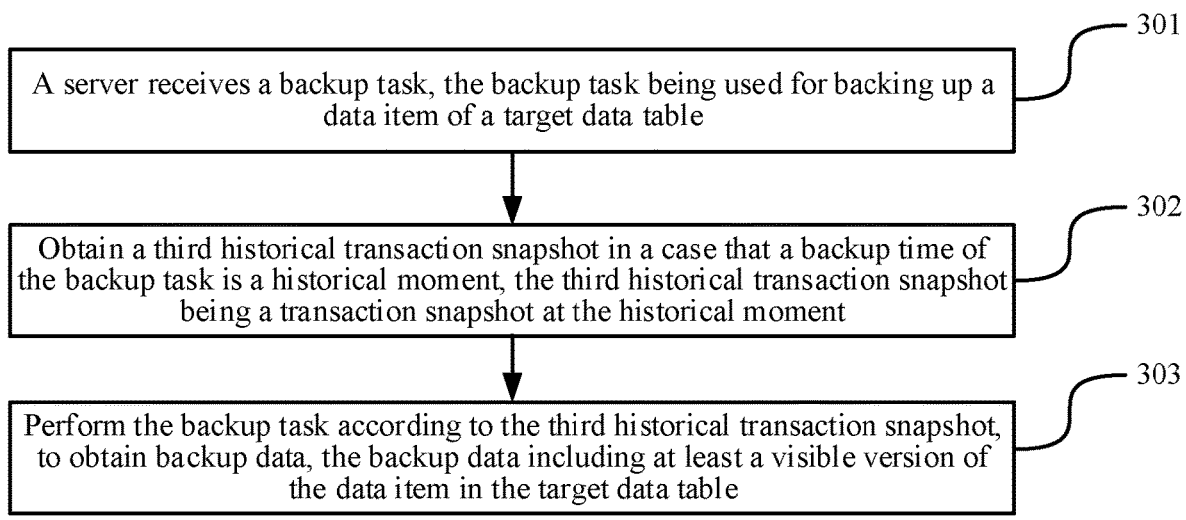
FIG. 3 is a flowchart of a data backup method according to an embodiment of this application.

A second type is historical state data point value backup. That is, historical state data and transitional state data may be backed up based on a historical transaction snapshot. A backup data package of the backup includes a meta information file, and data files of the historical state data and the transitional state data. An example in which a historical state data point value is backed up by using a data backup method shown in the flowchart of FIG. 3 is used for description below. Specifically, the data backup method includes the following process.

In step 301, a server receives a backup task, the backup task being used for backing up a data item of a target data table. A backup time indicated by the foregoing backup task includes a historical moment.

In step 302, the method obtains a third historical transaction snapshot in a case that a backup time of the backup task is a historical moment, the third historical transaction snapshot being a transaction snapshot at the historical moment.

In step 303, the method performs the backup task according to the third historical transaction snapshot, to obtain backup data, the backup data including at least a visible version of the data item in the target data table.

In this embodiment of this disclosure, through the third historical transaction snapshot, visibility of versions of the data item in the target data table may be determined according to the third historical transaction snapshot, thereby determining a visible version at a moment at which the snapshot is created, and backing up the visible version. That is, backup data obtained through the backup includes at least historical state data and transitional state data of the data item in the target data table. Through the foregoing backup, backup of a log file is not needed. Data backed up is a point value on the data item. The data item needs to be obtained in a logical manner, to generate backup data such as a data file.

The steps of determining visibility are as follows:

(1): When a version is generated by using an insert operation, and both a creation moment and a submission moment are within a historical time period, the version is determined to be visible.

(2): When a version is generated by using a deletion operation, and both a deletion moment and a submission moment are within the historical time period, the version is determined to be visible.

(3): When a version is generated by using an update operation, a creation moment is after a start moment of the historical time period, and a submission moment is within the historical time period, the version is determined to be visible.

Figure 4:
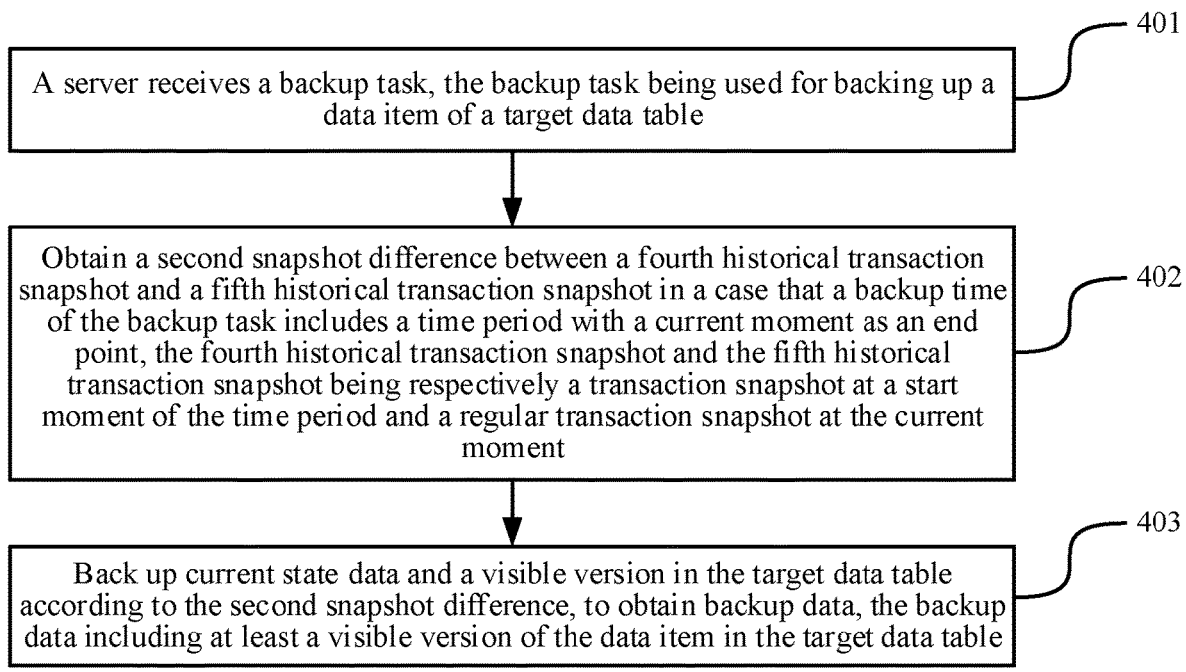
FIG. 4 is a flowchart of a data backup method according to an embodiment of this application.

For the backup of the point value of the data item shown in FIG. 2 and FIG. 3, this embodiment of this disclosure further involves the following two cases of backing up a segment value, including full state data segment value backup and historical state data segment value backup. Both of the two types of backup may be performed based on a snapshot difference, and are described separately as follows:

A third type is full state data segment value backup. A plurality of versions of a data item may be backed up simultaneously based on a historical transaction snapshot and a regular transaction snapshot. A backup data package of the backup includes a meta information file, data files of historical state data and transitional state data, current state data, and a log file. An example in which a full state data segment value is backed up by using a data backup method shown in the flowchart of FIG. 4 is used for description below. Specifically, the data backup method includes the following process:

In step 401, a server receives a backup task, the backup task being used for backing up a data item of a target data table. A backup time indicated by the foregoing backup task includes a time period with a current moment as an end point.

In step 402, the process obtains a second snapshot difference between a fourth historical transaction snapshot and a fifth historical transaction snapshot in a case that a backup time of the backup task includes a time period with a current moment as an end point, the fourth historical transaction snapshot and the fifth historical transaction snapshot being respectively a transaction snapshot at a start moment of the time period and a regular transaction snapshot at the current moment.

In step 403, the process backs up current state data and a visible version in the target data table according to the second snapshot difference, to obtain backup data, the backup data including at least a visible version of the data item in the target data table.

A method for backing up the current state data may be the same as the backup method of the current state data shown in FIG. 2. Details are not described herein. The backup of historical state data and transitional state data based on a second snapshot difference may be performed in a manner of logical reads, that is, visibility of versions of the data item in the target data table may be determined based on the second snapshot difference, and visible versions are backed up.

In an implementation, the historical state data is stored in blocks. Therefore, when all data of a block is within a range of a "historical transaction snapshot segment", block copy is performed, and a backup speed is high. When part of data of the block is within the range of the "historical transaction snapshot segment", a specific backup manner may be determined based on a certain proportion threshold, such as a first preset proportion. For example, when most of data in a data block is within the range of the "historical transaction snapshot segment", block copy is performed, and the backup speed is high. However, invalid data needs to be identified in a meta information file, such as an HMeta_00000001 series file. This is implemented by using block copy. When a small part of the data is within the range of the "historical transaction snapshot segment", visible versions of the data item are read out in a manner of logical reads and written into data files, such as HData_00000001 series files. However, a backup manner of recording relevant cases within the range of the historical state in the HMeta_00000001 series files is essentially a logical backup manner. That is, in this embodiment of this disclosure, to improve backup efficiency, a manner of block backup may alternatively be used. For example, the server may determine a second data block of the target data table, and the second data block stores historical state data of the target data table. The second data block is backed up in the form of block copy in a case of determining that the historical state data stored in the second data block are all visible versions based on the second snapshot difference, to obtain the backup data. Further, the second data block is backed up in the form of block copy in a case of determining that a proportion of visible versions in the second data block is greater than or equal to a first preset proportion based on the second snapshot difference, and invisible historical state data in the second data block is marked, to obtain the backup data. Visible versions in the second data block are read in the form of logical reads in a case of determining that a proportion of visible versions in the historical state data stored in the second data block is less than the first preset proportion based on the second snapshot difference, to obtain the backup data.

In the foregoing process, the first preset proportion may be represented in the form of a percentage or a decimal in a range of [0,1]. For example, a default value of the first preset proportion is 0.2, and the value range is [0,1].

In the process of full state data segment value backup, the backup data includes current state data, transitional state data, and historical state data. In addition, for a data item, the transitional state data and the historical state data are not only values at a time point, but also a plurality of values in a time period. The data backed up in the process may be divided into the following content according to a designated snapshot type (essentially a time point or a time period). Backup of current state data is certainly point value backup, and a manner of the current state data is the same as that of a first backup point. Backup of transitional state data (point value and segment value) may be point value backup or segment value backup. Backup of historical state data (point value and segment value) may be point value backup or segment value backup. This is not described again in this embodiment of this disclosure.

Figure 5:
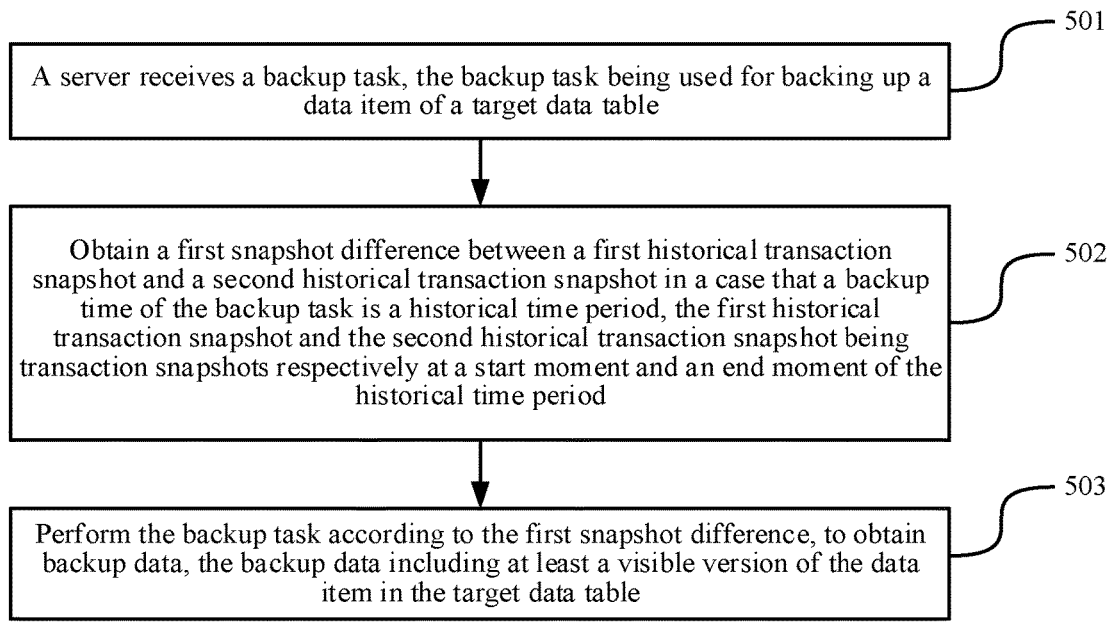
FIG. 5 is a flowchart of a data backup method according to an embodiment of this application.

A fourth type is historical state data segment value backup. A plurality of versions of a data item may be backed up simultaneously based on a historical transaction snapshot rather than a regular transaction snapshot. A backup data package of the backup includes a meta information file, and data files of historical state data and transitional state data. An example in which a historical state data segment value is backed up by using a data backup method shown in the flowchart of FIG. 5 is used for description below. Specifically, the data backup method includes the following process:

In step 501, a server receives a backup task, the backup task being used for backing up a data item of a target data table. The backup task is used for backing up a data item of a target data table. In this embodiment of this disclosure, the server may receive the backup task by receiving a backup instruction, and the backup instruction carries information about a backup target. The backup task may have different specific backup processes according to an indicated backup time. Only an example in which the backup time is a historical time period is used for description in this embodiment of this disclosure. That is, the backup instruction includes a start moment and an end moment of the historical time period. Target data of the backup is historical state data and transitional state data within a historical time period before a current moment.

In step 502, the process obtain a first snapshot difference between a first historical transaction snapshot and a second historical transaction snapshot in a case that a backup time of the backup task is a historical time period, the first historical transaction snapshot and the second historical transaction snapshot being transaction snapshots respectively at a start moment and an end moment of the historical time period.

In step 503, the process perform the backup task according to the first snapshot difference, to obtain backup data, the backup data including at least a visible version of the data item in the target data table.

In this embodiment of this disclosure, a process of performing the backup task based on the first snapshot difference is the same as a process of backing up the historical state data and the transitional state data based on the second snapshot difference in step 303. Details are not described herein. Further, in the backup process, whether to use block backup, physical backup, or logical backup may be determined based on the historical state data stored in the data block, to improve backup efficiency and backup flexibility. For example, the server may determine a first data block of the target data table, the first data block storing historical state data of the target data table. The first data block is backed up in the form of block copy in a case of determining, based on the first snapshot difference, that the historical state data stored in the first data block are all visible versions, to obtain the backup data. Further, the first data block is backed up in the form of block copy in a case of determining, based on the first snapshot difference, that a proportion of visible versions in the first data block is greater than or equal to a first preset proportion, and invisible historical state data in the first data block is marked, to obtain the backup data. The Visible versions in the first data block are read in the form of logical reads in a case of determining, based on the first snapshot difference, that a proportion of visible versions in the historical state data stored in the first data block is less than the first preset proportion, to obtain the backup data.

In any of the foregoing embodiments, when the transitional state data is backed up, a plurality of versions of a data item that meet the backup condition may be stored in independent files separately in the backup process, and the files are named by using an IData_00000001 series. The transitional state data may be backed up in a manner of logical reads.

In any of the foregoing embodiments, meta information of the historical state data and the transitional state data in the backup data are associated. The associated meta information may be respectively stored in meta information files with associated file names. For example, transitional state data of a historical transaction snapshot segment or a historical transaction snapshot is stored in a file IData, and associated historical state data is stored in a file HData. The purpose is to facilitate merge of data that is of one data item and that is within one historical transaction snapshot range in a restoration stage. In another possible implementation, the foregoing associated meta information may be further backed up to a meta information file, for example, a file named by using an HMeta_00000001 series. The foregoing association may be association through file names, so that a relationship between the transitional state data and the historical state data can be determined during data restoration, and data consistency can be ensured.

Further, a meta information list is constructed according to meta information of backup data and related meta information of the backup data during backup of the meta information, and backup is performed based on the meta information list, to obtain a meta information file. For the backup of the meta information, because the data volume is relatively small, a single thread is sufficient for the backup.

In a possible implementation, the backup efficiency may be further improved based on different granularities of the backup. The granularities of the backup include: table space level backup, file level backup, file block level backup, and data item level backup (such as the foregoing logical backup manner). In a database system, data is usually managed in a table space manner. A table space is a logical concept, is a logical storage layer for an upper layer (executor and data buffer), and shields storage details at a physical level. However, for a lower layer (operating system), the table space is a storage manager that can manage a plurality of physical files, even network storage. There may be a plurality of data files in a table space, and files may be dynamically added or deleted.

Therefore, the backup may be performed based on a granularity of the table space. If a backup condition is not included in the backup task, such as a WHERE condition, meta information of the table space of the target data table and all data files managed by the table space are directly backed up (a plurality of data files may be backed up by using concurrent backup).

If the backup task includes a backup condition, such as the WHERE condition, backup may be performed from the file granularity. That is, in a case that all data items of a first data file in the target data table meet a backup condition of the backup task in a backup process, the first data file is backed up. For example, if the WHERE condition covers most of data items in a data file, the corresponding data file is directly backed up.

In the backup process, when all data files or a part of data files in the target data table meet the backup condition of the backup task, and the part of data files accounts for a preset proportion of a quantity of files in the target data table, the plurality of data files or the part of data files are backed up. For example, if the WHERE condition covers most of a plurality of data files, the plurality of data files are backed up. If the WHERE condition covers most of all data files, concurrent backup is performed on the data files. The process is actually table space granularity backup.

In a case that a part of data items of the first data file in the target data table meet the backup condition of the backup task and a proportion of the part of data items is greater than or equal to a second preset proportion, the first data file is backed up, and invalid data in the first data file is marked. In a case that a part of data items of the first data file in the target data table meet the backup condition of the backup task and a proportion of the part of data items is less than the second preset proportion, data items in the first data file are read in the form of logical reads. For example, if the WHERE condition cannot cover most of data items of a data file, refer to the data block backup manner provided in the foregoing embodiment. The backup manner may be a block backup manner or a logical backup manner.

In this embodiment of this disclosure, to improve the backup efficiency, in any of the foregoing backup methods, in a case that a backup target of the backup task includes a plurality of data tables, concurrent backup of the plurality of data tables is supported. That is, for backup of different table objects, a concurrent backup manner may be used. For example, a backup thread is started for each data table to perform the backup.

In this embodiment of this disclosure, to improve the backup efficiency, in any of the foregoing backup methods, in a case that a backup target of the backup task includes a plurality of data files, concurrent backup of the plurality of data files is supported.

In this embodiment of this disclosure, to improve the backup efficiency, in any of the foregoing backup methods, in a case that a backup target of the backup task includes a plurality of data blocks, concurrent backup of the plurality of data blocks is supported.

At least two manners in the foregoing three types of concurrent backup manner may also be combined to implement the backup process, to improve the backup efficiency to the greatest extent. For example, concurrent backup are performed on both a plurality of data tables and a plurality of data files. A combination manner is not specifically limited in this embodiment of this disclosure.

For the three backup methods described in the embodiments of this disclosure, examples of differences between the three methods are as follows:

Example 1: A Logical Backup Manner

```
BEGIN;
    Set BACKUPNAME='/usr/bak/my_first_backup_02' READVIEW
FROM '20180109000000' TO '20180119000000'; //Logical backup based
on a snapshot difference
    BACKUP TYPE LO FROM my_table;
END;
Example 2: A physical backup manner
BEGIN;
    Set BACKUPNAME='/usr/bak/my_first_backup_04' READVIEW
default; //Physical backup based on a regular transaction snapshot
    BACKUP ALL; //Back up the entire system, if a table is backed up,
"BACKUP FROM my_table;" is used
    END;
Example 3: A hybrid backup manner
BEGIN;
    Set BACKUPNAME='/usr/bak/my_first_backup_04' READVIEW
FROM '20180109000000' TO now( ); //Hybrid backup based on a
snapshot difference, and starting from a historical time '20180109000000',
all submitted data visible in this transaction needs to be backed up
    BACKUP FROM my_table01, my_table02, my_table03; //Back up
three designated tables, or back up the entire system
    END
```

Optionally, when the backup is performed according to the block backup manner, there are two cases for data on a data block. In a first case, data does not cross pages. A page has an enough space to store data meeting a condition on a data block. In a second case, data crosses pages. There is no enough space for a page to store data meeting a condition on a data block, and a continuous page exists subsequently.

Figure 6:
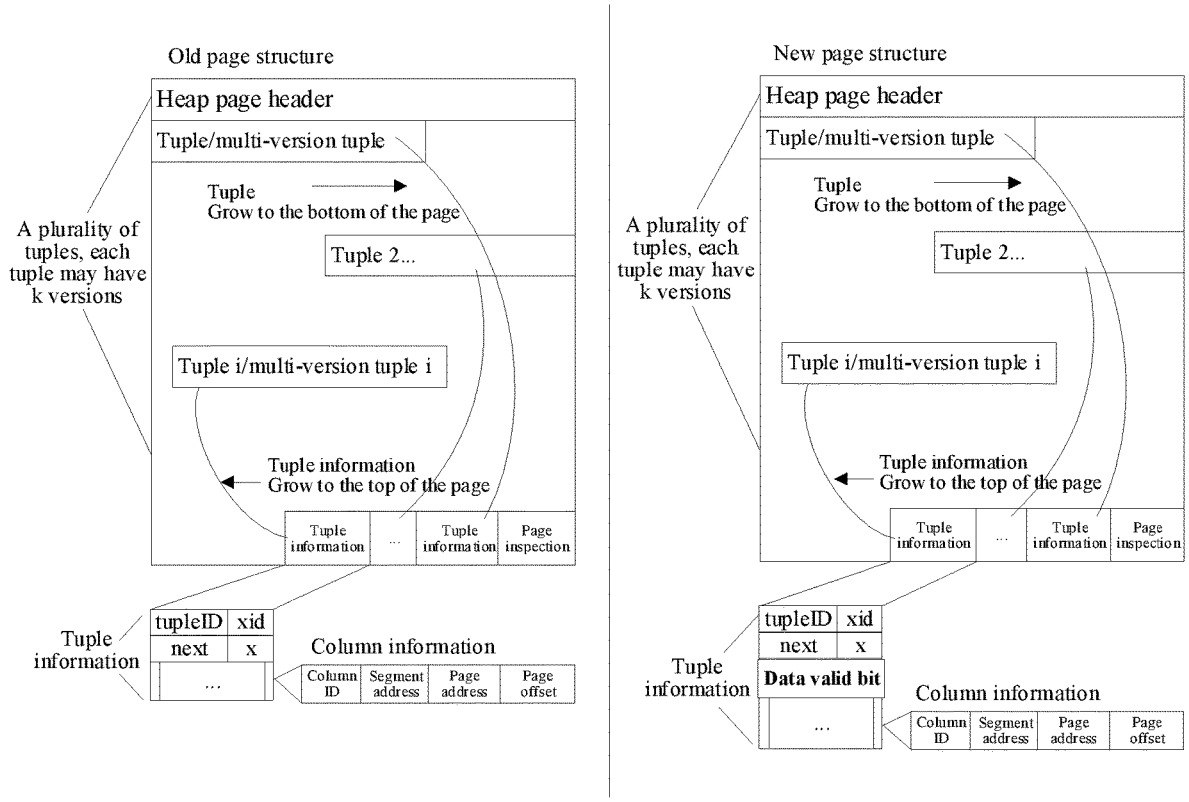
FIG. 6 is a page comparison diagram according to an embodiment of this application.

Based on the foregoing case, for a data block, if the data block does not cross pages, an end of a page in a data structure thereof is marked with a special identifier, indicating that there is no association between a page after this page and this page. As shown in FIG. 6, a data valid bit may be added to the page. The data valid bit may be used for indicating whether data on this page crosses pages. In a possible implementation, the data valid bit may include two parts: one part is data visible flags, all set to 0; the remaining bit (referred to as a cross-page flag) indicates whether the data on this page crosses pages. 1 indicates that the data crosses pages, and 0 indicates that the data does not cross pages. When there is a cross-page flag, searching for data cannot be stopped, and read of a next page is continued.

Based on a temporal database, an embodiment of this disclosure provides a backup method based on temporal data, so that data in any state in the full state data may be backed up in a plurality of flexible manners, such as a logical manner, a physical manner, and a combination of the logical manner and the physical manner, to provide effective guarantee for effective storage, safety, and reliability of the temporal data.

The physical backup involved in the foregoing embodiment, such as the block copy manner, is applicable to data backup in all cases. The logical backup involved in the foregoing embodiment, that is, the backup performed in a manner of logical reads, such as a manner of reading a visible version of a data item, is also applicable to data backup in all cases. Data backup is implemented based on a flexible combination of the physical backup and the logical backup, which can greatly improve backup efficiency. A combination manner of the foregoing physical backup and logical backup is not limited in this embodiment of this disclosure. Taking the following implementation scenarios as an example, various backup policies may be made through the combination of the foregoing physical backup and logical backup, to ensure efficient backup while meeting backup requirements during operation.

In an implementation scenario, the foregoing three backup methods may be combined to make a backup policy, that is, backup (logical backup and physical backup) is performed in different manners at different times. An optional backup policy is the same as the traditional database backup policy. For example, a feasible backup policy is as follows: performing full backup on a database every six months (including all data, namely full state data), performing zero-level backup every month (excluding a read-only table space), performing one-level backup once a week, and performing two-level backup once a day. A backup level may be set based on actual requirements. Another feasible backup policy is as follows: performing backup by using a dual policy, that is, a combination of the logical backup and the physical backup. According to a data volume and tolerance to data loss, regular physical backup is performed first, and then logical backup is performed at intervals of two complete physical backup times. By performing the foregoing backup policy, data security and consistency can be improved, and efficient backup can be ensured.

The visible version of the data item involved in this embodiment of this disclosure refers to a version that can be read by a transaction at a moment corresponding to a transaction snapshot corresponding to the backup task. For any version of any tuple in the data table, whether the version is visible is determined according to a transaction snapshot, and a creation moment, a deletion moment, and a submission moment of the version. Each time the server reads a tuple from the data table, life cycle information of the tuple may be read, that is, information such as a creation moment, a deletion moment, and a submission moment of the version. Determining of visibility based on a historical time period is taken as an example:

(1): When the version is generated by using an insert operation, the creation moment is before a start moment of the historical time period, and the submission moment is within the historical time period, the version is determined to be visible; or, when both the creation moment and the submission moment are within the historical time period, the version is determined to be visible.

(2): When the version is generated by using a deletion operation, the deletion moment is before the start moment of the historical time period, and the submission moment is within the historical time period, the version is determined to be visible; or, when both the deletion moment and the submission moment are within the historical time period, the version is determined to be visible.

(3): When the version is generated by using an update operation, the creation moment is before the start moment of the historical time period, and the submission moment is within the historical time period, the version is determined to be visible; or, when the creation moment is after the start moment of historical time period, and the submission moment is within the historical time period, the version is determined to be visible.

It is to be understood that, although each step of the flowcharts in FIG. 2 to FIG. 5 is displayed sequentially according to arrows, the steps are not necessarily performed according to an order indicated by arrows. Unless otherwise clearly specified in this specification, the steps are performed without any strict sequence limit, and may be performed in other orders. In addition, at least some steps in FIG. 2 to FIG. 5 may include a plurality of substeps or a plurality of stages. The substeps or the stages are not necessarily performed at a same moment, and instead may be performed at different moments. A performing sequence of the substeps or the stages is not necessarily performing in sequence, and instead may be performing in turn or alternately with another step or at least some of substeps or stages of the another step.

Figure 7:
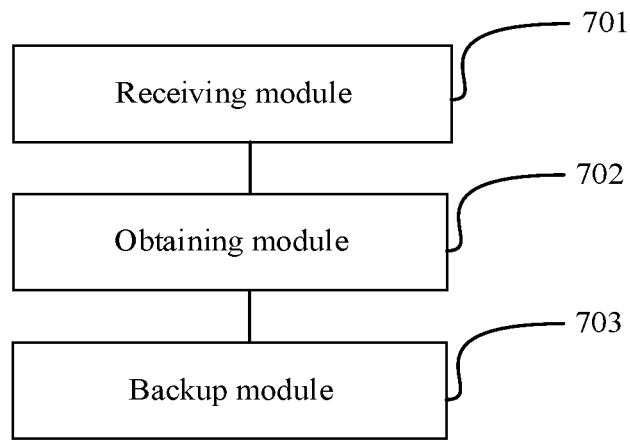
FIG. 7 is a schematic structural diagram of a data backup apparatus according to an embodiment of this application.

FIG. 7 is a schematic structural diagram of a data backup apparatus according to an embodiment of this disclosure. Referring to FIG. 7, the apparatus can include a receiving module 701 that is configured to receive a backup task, the backup task being used for backing up a data item of a target data table, an obtaining module 702 that is configured to obtain a first snapshot difference between a first historical transaction snapshot and a second historical transaction snapshot in a case that a backup time of the backup task is a historical time period, the first historical transaction snapshot and the second historical transaction snapshot being transaction snapshots respectively at a start moment and an end moment of the historical time period, and a backup module 703 that is configured to perform the backup task according to the first snapshot difference, to obtain backup data, the backup data including at least a visible version of the data item in the target data table. Of course, it should be understood that one or more of the modules described in this disclosure can be implemented by hardware, such as circuitry.

Based on a temporal database, the apparatus provided in this embodiment of this disclosure provides a backup method based on temporal data, so that data in any state in the full state data may be backed up in a plurality of flexible manners, such as a logical manner, a physical manner, and a combination of the logical manner and the physical manner, to provide effective guarantee for effective storage, safety, and reliability of the temporal data.

In a possible implementation, the backup module 703 is further configured to determine a first data block, the first data block storing historical state data of the target data table, and back up the first data block in the form of block copy in a case of determining, based on the first snapshot difference, that the historical state data stored in the first data block are all visible versions, to obtain the backup data.

In a possible implementation, the backup module 703 is further configured to back up the first data block in the form of block copy in a case of determining, based on the first snapshot difference, that a proportion of visible versions in the first data block is greater than or equal to a first preset proportion, and mark invisible historical state data in the first data block, to obtain the backup data, and read visible versions in the first data block in the form of logical reads in a case of determining, based on the first snapshot difference, that a proportion of visible versions in the historical state data stored in the first data block is less than the first preset proportion, to obtain the backup data.

In another possible implementation the obtaining module 702 is further configured to obtain, in a case that the backup time of the backup task is a current moment, a regular transaction snapshot at the current moment, and the backup module 703 is further configured to back up a data block in which current state data is located in the form of block copy based on the regular transaction snapshot, to obtain the backup data.

In a possible implementation, the backup module 703 is further configured to perform segmented backup on a log file of the current state data from a start moment of a backup process to an end moment of the backup process in a case that a backup target of the backup task includes the current state data.

In a further possible implementation, the obtaining module 702 is further configured to obtain a third historical transaction snapshot in a case that the backup time of the backup task is a historical moment, the third historical transaction snapshot being a transaction snapshot at the historical moment, and the backup module 703 is further configured to perform the backup task according to the third historical transaction snapshot, to obtain the backup data, the backup data including at least a visible version of the data item in the target data table.

In a possible implementation, the obtaining module 702 is further configured to obtain a second snapshot difference between a fourth historical transaction snapshot and a fifth historical transaction snapshot in a case that the backup time of the backup task includes a time period with a current moment as an end point, the fourth historical transaction snapshot and the fifth historical transaction snapshot being respectively a transaction snapshot at a start moment of the time period and a regular transaction snapshot at the current moment, and the backup module 703 is further configured to back up current state data and a visible version in the target data table according to the second snapshot difference, to obtain the backup data, the backup data including at least a visible version of the data item in the target data table.

In a possible implementation, in a case that a backup target of the backup task includes historical state data and transitional state data, the backup data includes meta information files and data files of the historical state data and the transitional state data. In a case that the backup target of the backup task includes current state data, the backup data further includes a meta information file, a data file, and a log file of the current state data. Further, file names of meta information files of historical state data and transitional state data in the backup data can be associated.

In a possible implementation, the backup module 703 is further configured to construct a meta information list according to meta information of a backup target and related meta information of the backup target during backup of the meta information, and perform backup based on the meta information list, to obtain a meta information file. Data formats of the backup data can be various files stored in a directory, or a plurality of stored tar packages.

In further implementation, the backup module 703 is further configured to back up, in a case that all data items of the first data file in the target data table meet a backup condition of the backup task in a backup process, the first data file, back up, in a case that a part of data items of the first data file in the target data table meet the backup condition of the backup task and a proportion of the part of data items is greater than or equal to a second preset proportion, the first data file, and mark invalid data in the first data file, and read data items in the first data file in the form of logical reads in a case that a part of data items of the first data file in the target data table meet the backup condition of the backup task and a proportion of the part of data items is less than the second preset proportion.

In a possible implementation, the backup task is performed in at least one of the following manners supporting, in a case that a backup target of the backup task includes a plurality of data tables, concurrent backup of the plurality of data tables supporting, in a case that a backup target of the backup task includes a plurality of data files, concurrent backup of the plurality of data files, and supporting, in a case that a backup target of the backup task includes a plurality of data blocks, concurrent backup of the plurality of data blocks.

All the foregoing optional technical solutions may be combined to form optional embodiments of the present disclosure.

When the data backup apparatus provided in the foregoing embodiment performs data backup, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the data backup apparatus provided in the foregoing embodiments is based on the same concept as the data backup method in the foregoing embodiments. For a specific implementation process, refer to the method embodiments.

The data backup apparatus may be implemented in the form of a computer program, and the computer program may be run on a terminal. A storage medium, such as a non-transitory computer readable memory, of the terminal may store program modules forming the data backup apparatus, for example, the receiving module 701, the obtaining module 702, and the backup module 703 shown in FIG. 7. The computer program formed by the program modules, when run by a processor, causes the processor to perform the operations of the data backup method according to the embodiments of this disclosure.

Figure 8:
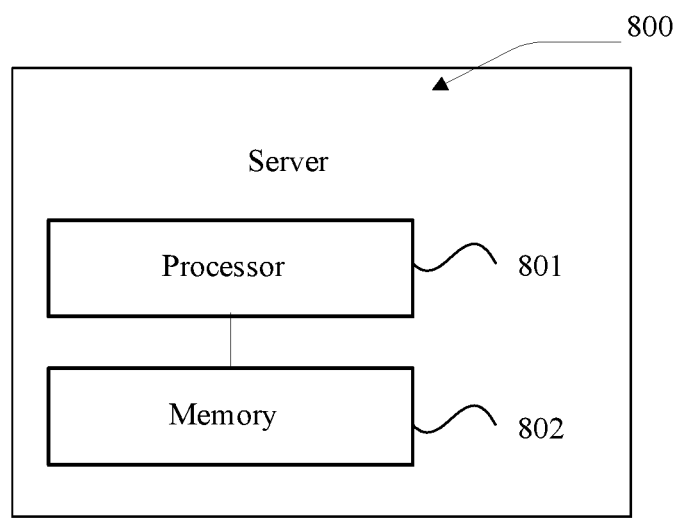
FIG. 8 is a schematic structural diagram of a server according to an embodiment of this application.

FIG. 8 is a schematic structural diagram of a server according to an embodiment of this disclosure. The server 800 may vary greatly due to different configurations or performance, and may include one or more processors (such as central processing units (CPUs)) 801 and one or more memories 802. The memory 802 stores at least one instruction, the at least one instruction being loaded and executed by the processor 801 to implement the methods provided in the foregoing method embodiments. Certainly, the server may further include components such as a wired or wireless network interface, a keyboard, and an input/output interface, to facilitate inputs/outputs. The server may further include another component configured to implement functions of a device.

The memory 802 may be a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or a cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

An embodiment of this disclosure further provides a computer-readable storage medium, applicable to a server. The computer-readable storage medium stores at least one instruction, at least one program, a code set or an instruction set, the instruction, the program, the code set or the instruction set being loaded and executed by a processor to implement the operations performed by the server in the data backup method according to the foregoing embodiments.

A person of ordinary skill in the art may understand that all or some of the steps of the embodiments may be implemented by hardware or a program instructing related hardware. The program may be stored in a non-transitory computer-readable storage medium. The storage medium may be a ROM, a magnetic disk, or an optical disc.

Technical features of the embodiments may be randomly combined. To make description concise, not all possible combinations of the technical features in the embodiments are described. However, as long as combinations of these technical features do not contradict each other, it is to be considered that the combinations all fall within the scope recorded by this specification.

The exemplary embodiments only show several implementations of this disclosure and are described in detail, but they cannot be construed as a limit to the patent scope of the present disclosure. A person of ordinary skill in the art may make various changes and improvements without departing from the ideas of this disclosure, which shall all fall within the protection scope of this disclosure. Therefore, the protection scope of this disclosure shall be subject to the protection scope of the appended claims.

What is claimed is:

1. A data backup method that is performed by a server, the method comprising:
   receiving a backup task that is used for backing up a data item of a target data table;
   obtaining a first snapshot difference between a first historical transaction snapshot and a second historical transaction snapshot when a backup time of the backup task is a historical time period, where the first historical transaction snapshot and the second historical transaction snapshot are transaction snapshots respectively located at a start moment and an end moment of the historical time period;
   determining a version of the data item that is visible based at least on a transaction submission time of the version of the data item being within the historical time period; and
   performing the backup task based on the first snapshot difference to obtain backup data that includes at least the visible version of the data item in the target data table, wherein
   the performing the backup task includes backing up a first data block that stores a plurality of state data of the target data table, and
   whether the backing up of the first data block is in the form of a block copy of the plurality of state data is based on a proportion of the plurality of state data stored in the first data block that are visible versions.

2. The method according to claim 1, wherein the performing the backup task further comprises:
   determining the first data block that stores a plurality of historical state data of the target data table; and
   backing up the first data block in the form of the block copy to obtain the backup data when, based on the first snapshot difference, the plurality of historical state data stored in the first data block are all visible versions.

3. The method according to claim 2, wherein the performing the backup task further comprises:
   backing up the first data block in the form of the block copy to obtain the backup data when, based on the first snapshot difference, the proportion of the visible versions in the first data block is greater than or equal to a first preset proportion, and marking invisible historical state data in the first data block.

4. The method according to claim 3, wherein the performing the backup task further comprises:
   reading the visible versions in the first data block in the form of logical reads to obtain the backup data when, based on the first snapshot difference, the proportion of the visible versions in the plurality of historical state data stored in the first data block is less than the first preset proportion.

5. The method according to claim 1, further comprising:
   obtaining a regular transaction snapshot at a current moment when the backup time of the backup task is the current moment; and
   backing up a second data block in which current state data is located in the form of the block copy based on the regular transaction snapshot to obtain the backup data.

6. The method according to claim 5, further comprising:
   performing segmented backup on a log file of the current state data from a start moment of a backup process to an end moment of the backup process when a backup target of the backup task includes the current state data.

7. The method according to claim 1, further comprising:
   obtaining a third historical transaction snapshot when the backup time of the backup task is a historical moment, the third historical transaction snapshot being a transaction snapshot at the historical moment; and
   performing the backup task based on the third historical transaction snapshot to obtain the backup data including at least the visible version of the data item in the target data table.

8. The method according to claim 1, further comprising:
   obtaining a second snapshot difference between a fourth historical transaction snapshot and a fifth historical transaction snapshot when the backup time of the backup task includes a time period with a current moment as an end point, the fourth historical transaction snapshot and the fifth historical transaction snapshot respectively being a transaction snapshot located at a start moment of the time period and a regular transaction snapshot located at the current moment; and
   backing up current state data and a visible version in the target data table based on the second snapshot difference to obtain the backup data including at least the visible version of the data item in the target data table.

9. The method according to claim 1, wherein, when a backup target of the backup task includes:
   historical state data and transitional state data, the backup data includes meta information files and data files of the historical state data and the transitional state data; and
   current state data, the backup data further includes a meta information file, a data file, and a log file of the current state data.

10. The method according to claim 1, wherein file names of meta information files of historical state data and transitional state data in the backup data are associated.

11. The method according to claim 1, wherein the performing the backup task based on the first snapshot difference to obtain backup data further comprises:
    constructing a meta information list based on meta information of a backup target and related meta information of the backup target during backup of the meta information, and performing backup based on the meta information list to obtain a meta information file.

12. The method according to claim 1, further comprising:
    backing up a first data file in the target data table when all data items of the first data file meet a backup condition of the backup task in a backup process; and backing up the first data file when a part of data items of the first data file in the target data table meet the backup condition of the backup task and a proportion of the part of data items is greater than or equal to a second preset proportion, and marking invalid data in the first data file.

13. The method according to claim 12, further comprising:
reading data items in the first data file in the form of logical reads when a part of data items of the first data file in the target data table meet the backup condition of the backup task and a proportion of the part of data items is less than the second preset proportion.

14. The method according to claim 1, wherein the backup task is performed in at least one of the following manners:
supporting concurrent backup of a plurality of data tables when a backup target of the backup task includes the plurality of data tables;
supporting concurrent backup of a plurality of data files when the backup target of the backup task includes the plurality of data files; and
supporting concurrent backup of a plurality of data blocks when the backup target of the backup task includes the plurality of data blocks.

15. A data backup apparatus including processing circuitry that is configured to cause the data backup apparatus to perform the method of claim 1.

16. A server including a processor and a memory that stores at least one instruction that, when executed by the processor, causes the server to perform operations comprising:
receiving a backup task that is used for backing up a data item of a target data table;
obtaining a first snapshot difference between a first historical transaction snapshot and a second historical transaction snapshot when a backup time of the backup task is a historical time period, the first historical transaction snapshot and the second historical transaction snapshot being transaction snapshots respectively located at a start moment and an end moment of the historical time period;
determining a version of the data item that is visible based at least on a transaction submission time of the version of the data item being within the historical time period; and
performing the backup task based on the first snapshot difference to obtain backup data including at least the visible version of the data item in the target data table, wherein
the performing the backup task includes backing up a first data block that stores a plurality of historical state data of the target data table, and
whether the backing up of the first data block is in the form of a block copy of the plurality of historical state data is based on a proportion of the plurality of historical state data stored in the first data block that are visible versions.

17. The server according to claim 16, wherein the at least one instruction, when executed by the processor, causes the server to perform operations further comprising:
determining the first data block that stores a plurality of historical state data of the target data table; and
backing up the first data block in the form of the block copy to obtain the backup data when, based on the first snapshot difference, the plurality of historical state data stored in the first data block are all visible versions.

18. The server according to claim 17, wherein the at least one instruction, when executed by the processor, causes the server to perform operations further comprising:
backing up the first data block in the form of the block copy to obtain the backup data when, based on the first snapshot difference, the proportion of the visible versions in the first data block is greater than or equal to a first preset proportion, and marking invisible historical state data in the first data block.

19. A non-transitory computer-readable storage medium storing at least one instruction that, when executed by a processor, causes the processor to perform operations comprising:
receiving a backup task that is used for backing up a data item of a target data table;
obtaining a first snapshot difference between a first historical transaction snapshot and a second historical transaction snapshot when a backup time of the backup task is a historical time period, the first historical transaction snapshot and the second historical transaction snapshot being transaction snapshots respectively located at a start moment and an end moment of the historical time period;
determining a version of the data item that is visible based at least on a transaction submission time of the version of the data item being within the historical time period; and
performing the backup task based on the first snapshot difference to obtain backup data including at least a visible version of the data item in the target data table, wherein
the performing the backup task includes backing up a first data block that stores a plurality of historical state data of the target data table, and
whether the backing up of the first data block is in the form of a block copy of the plurality of historical state data is based on a proportion of the plurality of historical state data stored in the first data block that are visible versions.

20. The non-transitory computer-readable storage medium according to claim 19, wherein the at least one instruction, when executed by the processor, causes the processor to perform operations further comprising:
determining the first data block that stores a plurality of historical state data of the target data table; and
backing up the first data block in the form of the block copy to obtain the backup data when, based on the first snapshot difference, the plurality of historical state data stored in the first data block are all visible versions.

* * * * *